Sept. 19, 1933.   H. J. EPWORTH   1,927,630
SHARPENER FOR LAWN MOWERS AND THE LIKE
Filed Feb. 6, 1933
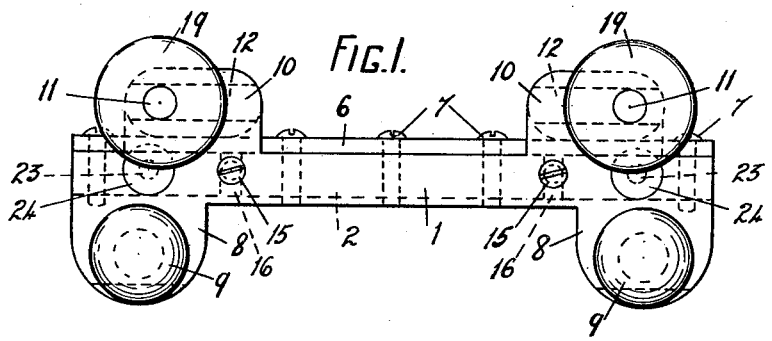
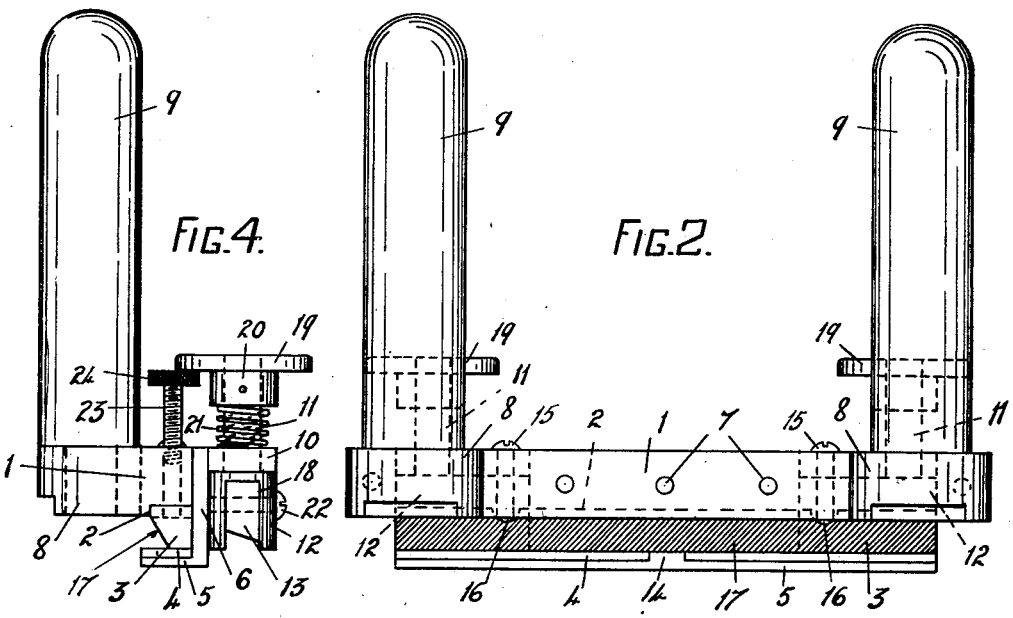
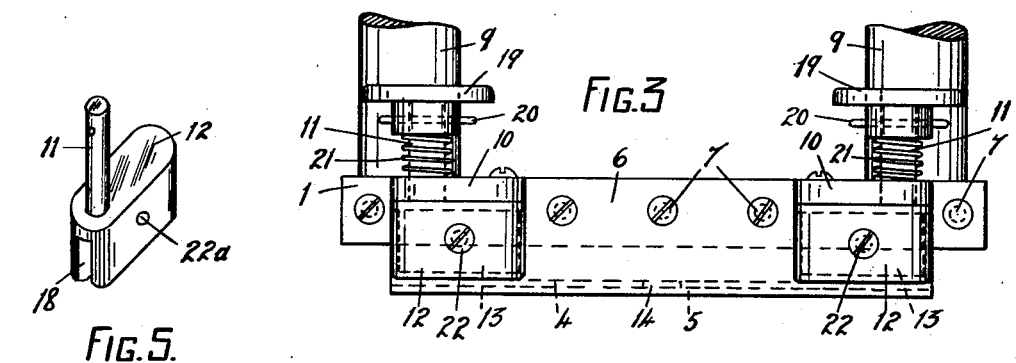
INVENTOR:
Henry Jackson Epworth Patented Sept. 19, 1933

1,927,630

UNITED STATES PATENT OFFICE 1,927,630

SHARPENER FOR LAWN-MOWERS AND THE LIKE

Henry Jackson Epworth, Edinburgh, Scotland

Application February 6, 1933, Serial No. 655,359, and in Great Britain March 11, 1932

15 Claims. (Cl. 51—205)

This invention relates to an improved sharpening tool or appliance for sharpening the rotary cutter blades and/or ledger blade of lawn-mowers and like machines.

The improved tool or appliance comprises a guide member grooved to fit over and travel along the edge of the ledger blade, the groove of said guide member being preferably formed or provided with one or more filing or grinding surfaces for sharpening the ledger blade when the guide member is reciprocated along the edge of the ledger blade. Carried by the said guide member is a sharpener for filing or grinding the rotary cutter blades, this cutter blade sharpener having a groove formed or provided with a filing or grinding surface which is fitted over the edge of the rotary cutter blade. The cutter blade sharpener is adjustable to the angle of pitch of the rotary blade so that, when the guide member carrying the cutter blade sharpener is reciprocated, the said sharpener will travel along the edge of the rotary blade while turning the latter in one direction or the other. The grooves in the guide member and cutter blade sharpener may be made or provided with file surfaces for filing the edges of the blades, or the grooves may be formed or provided with grinding surfaces for sharpening the edges of the blades by grinding or abrasion. The filing or grinding surfaces are formed to file or grind the edges of the blades to the correct angles.

If the rotary cutter blades are to be sharpened without sharpening the ledger blade, the guide member carrying the cutter blade sharpener is reciprocated without pressing the filing or grinding surface of said guide member too firmly against the edge of the ledger blade. If the ledger blade only is to be sharpened, the cutter blade sharpener may be removed from the guide member, for which purpose the cutter blade sharpener is made detachable from the guide member, or it need not be engaged with one of the cutter blades. Handles are provided on the guide member for enabling it to be reciprocated.

In order to enable the cutter blade sharpener to be pressed firmly against the edge of the rotary cutter blade, the cutter blade sharpener is preferably slidably and adjustably mounted in the guide member and pressed towards the cutter blade by thumb, finger or hand pressure against the action of a returning spring.

The guide member may be fitted with right and left-hand cutter blade sharpeners, so that the tool or appliance can be used for lawn-mowers having the rotary cutter blades inclined in either direction.

The improved tool or appliance enables the lawn mower blades to be sharpened without detaching them from the body of the machine and the blades can be sharpened to the correct angles without requiring skill.

It will be understood that while one or more faces of each groove is or are formed as filing or grinding surfaces, the other faces of the groove serve as guiding and bearing surfaces for guiding the tool along the edge of the blade to be sharpened.

In order that the invention may be more clearly understood, reference is hereinafter made to the accompanying drawing illustrating one construction of the improved tool or appliance.

Fig. 1 is a plan view,
Fig. 2 a front view,
Fig. 3 a rear view and
Fig. 4 is an end view of the tool or appliance.
Fig. 5 is a perspective view of the cutter blade sharpener detached.

As illustrated, the appliance comprises a bar of steel or other suitable material 1 having a recess or groove 2 throughout its length and on its underside to receive the upper part of a file or grinder 3, the lower part of which rests on a file or grinder 4 supported by the horizontal flange 5 of an L-shaped guide or bar 6 secured to the rear edge of the bar 1 by means of screws or studs 7.

The bar 1 is formed on its front edge with two lugs or projections 8, one at each end of the bar 1, to provide sockets into which the reduced screw-threaded ends of handles 9 are fitted. On the rear edge of the bar 1 are formed two lugs or projections 10, one near each end, said projections or lugs being provided with vertical holes through which pass the pins or stems 11 of blocks 12, each carrying a file or grinder 13.

The grinder 4 is kept in position on the flange 5 of the L-shaped bar 6 by means of an upstanding projection 14 on the flange 5 engaging in a corresponding notch or recess in the grinder 4. The grinder 3 is held in position on the grinder 4 by means of screws 15 passing through the bar 1 and engaging notches 16 in the grinder 3.

The grinder 3 is provided with an angled front face 17 which is serrated across its depth to a fine file surface, the angled front face 17 forming with the upper surface of the grinder 4, which is also serrated to a fine file surface, a V-shaped recess into which the ledger blade of the lawn mower fits, the angle of the front face of the grinder 3 being made to suit the angle of the cutting edge of the ledger blade.

Each guide block 12 has a groove or recess 18 to receive the grinder 13 which is retained in said groove or recess 18 by means of a screw or pin 22 passing through a hole 22a in the side of the groove or recess and in the grinder 13. The bottom face of each grinder is angled and is serrated across its face to a fine file surface. The pin or stem 11 of the guide block 12 passing upwards through the vertical hole in one of the lugs or projections 10 is provided at its upper end with a head or push piece 19 which is secured to the stem 11 by means of a split pin or the like 20. Springs 21 are fitted around the stems 11 between the lugs 10 and the push pieces 19 to normally keep the guide blocks 12 against the underside of the lugs 10. An adjustable limit stop comprising a screw-threaded pin 23 having a knurled head 24 is provided in a suitable position beneath each push piece 19, said pins being adjustable in screw-threaded holes in the bar 1.

The guide blocks 12 are rounded at their ends and the pins or spindles 11 are rotatable in the vertical holes in the lugs 10 to allow the guide blocks 12 to adjust themselves or to be adjusted to the angle of pitch of the rotary cutter blades of the mower.

In operating the device, the lawn mower is turned over with the ledger blade uppermost and rested in a convenient position to leave the wheels free to rotate. The ends of the rotary blades which first pass under the ledger blades are noted and if this end of the mower happens to be the right hand end, the right hand guide block 12 is placed over one of the blades and the appliance and blade are then pulled towards the ledge blade until the V-shaped groove formed by the grinders 3 and 4 engages over the edge of the ledger blade. The push piece 19 is depressed by the hand until the grinder 13 presses firmly on the rotary blade and the limit stop 23 is adjusted so that the push piece 19 can only be depressed sufficient to allow the blade to be sharpened without waste of material. The appliance is then held by the handles 9 and reciprocated along the edge of the ledger blade, the guide block 12 turning the rotary blade away and towards the ledger blade as it is moved backwards and forwards, the grinder 13 sharpening the rotary blade and the grinders 3 and 4 sharpening the ledger blade. The same operation is repeated in turn for each rotary blade.

If the left-hand end of the rotary blade first passes under the ledger blade, the left-hand guide block 12 is used, and the same operation, as above described, is performed, the only difference being that the operation is started from the left-hand side instead of from the right-hand side. When using the left-hand guide block 12, the right-hand one can be removed, and when the right-hand guide block 12 is being used, the left-hand one can be removed, or both guide blocks 12 can be removed if only the ledger blade requires sharpening.

If it is only necessary to sharpen the rotary blades, this is accomplished by placing the tool over both ledger blade and rotary blade as previously described and by exerting more pressure on the push piece 19 and less on the handles 9, the rotary blades only are sharpened. By exerting greater pressure on the handles 9 and less on the push piece 19, the ledger blade only can be sharpened.

It is to be understood that the invention is not limited to the particular construction herein described and illustrated, which may be varied within the scope of the appended claims. For instance the appliance may consist of a short bar 1 having only one handle 9 and one guide block 12 and grinder 13 for sharpening the rotary blades, the guide block 12 and grinder 13 being reversed to suit either right or left hand angled rotary blades.

Furthermore the tool may be arranged to be mechanically reciprocated while being guided along the ledger blade. The grinding or abrading surfaces may be either renewable or otherwise, or they may be constituted by one or more rotary abrading discs which may be revolved by gearing deriving motion from the manual or mechanical reciprocation of the tool along the ledger blade.

I claim:

1. An appliance for sharpening the blades of a machine having a helically bladed rotary cutter and a coacting ledger blade, comprising a guide member adapted to slidably embrace the edge of the ledger blade, a sharpener adapted to slidably and detachably embrace the edge of any of the helical blades, and means for adjustably mounting said sharpener on said member to permit said sharpener to automatically adjust itself to the angle of pitch of the helical blade engaged by it.

2. An appliance as defined in claim 1 having a grooved guide member provided within the groove with abrading surfaces for sharpening the edge of the ledger blade.

3. An appliance as defined in claim 1 having a guide member formed with a longitudinal groove therein, and abrading elements detachably secured within the said groove and adapted to sharpen the edge of a ledger blade along which said member is reciprocated.

4. An appliance as defined in claim 1 having a block longitudinally grooved to engage the edge of any one of the helical blades and an abrading element set in the groove in said block.

5. An appliance for sharpening the blades of a machine having a helically bladed cutter and a coacting ledger blade, comprising a member slidable along the edge of the ledger blade, a sharpener slidable along the edge of any of the helical blades, and means pivotally connecting said sharpener to said member, the pivotal axis of the pivoting means being eccentrically disposed with respect to said sharpener.

6. An appliance as defined in claim 5 having pivoting means adapted to permit of movement of the sharpener towards or away from the edge of the helical blade engaged by it, and an abutment on said pivoting means whereby pressure may be manually applied to press the sharpener against the edge of the helical blade.

7. An appliance as defined in claim 5 having a pair of sharpeners each adapted, for sliding movement along the edge of one of the helical blades, and means detachably and pivotally connecting each sharpener to said member to position the sharpeners at opposite ends of said member, the pivotal axis of each sharpener being eccentrically disposed with respect to its sharpener and the pivotal axes of the sharpeners being opposed in relation to one another with respect to their sharpeners, thereby to enable one sharpener to coact with a left-handed helical blade and to enable the other sharpener to coact with a right-handed helical blade.

8. An appliance for sharpening the blades of a machine having a helically bladed cutter and a coacting ledger blade, comprising a guide member adapted to slidably and detachably engage the edge of the ledger blade, a handle attached to said member for manually reciprocating it, abrading elements on said member for sharpening the ledger blade, a sharpener adapted to detachably and slidably engage the edge of any of the helical blades, and means adjustably supporting the sharpener from said member.

9. An appliance for sharpening the blades of a machine having a helically bladed cutter and a coacting ledger blade, comprising a bar having a longitudinal groove to slidably and detachably engage the edge of the ledger blade, a hand grip attached to said bar for manually reciprocating it, a pair of blocks eccentrically and detachably pivoted to said bar in spaced relationship, each block having a longitudinal groove therein, and abrading elements set in the grooves in said blocks for engaging the edges of the helical blades.

10. An appliance for sharpening the blades of a machine having a helically bladed cutter and a coacting ledger blade, comprising a member adapted to slidably and detachably engage the edge of the ledger blade, a sharpener adapted to slidably and detachably engage the edge of any of the helical blades, a trunnion projecting from said sharpener, a socket on said member apertured to slidably and rotatably receive said trunnion, a spring for withdrawing said sharpener from the helical blade, stops for limiting the sliding movement of said trunnion with respect to the socket, and means on said trunnion for applying manual pressure thereto against the action of said spring to press the sharpener against the helical blade.

11. An appliance as defined in claim 10 having an adjustable limit stop for limiting the movement of the sharpener towards the helical blade.

12. A manually operable tool for sharpening the ledger blade of a lawn mower or like machine having a rotary cutter and a coacting ledger blade, comprising a member having a longitudinal groove to slidably and detachably engage the edge of the ledger blade, a handle attached to and projecting from said member, and abrading elements detachably fitted in said groove and having angularly disposed abrading surfaces for engaging and sharpening the angularly disposed cutting faces of the ledger blade.

13. A manually operable tool for sharpening the cutting edges of the blades of a helically bladed rotary cutter rotatably cooperating with a ledger blade, comprising a block having a longitudinal groove adapted to slidably and detachably engage over the cutting edge of any of the blades of the rotary cutter, an abrading element set in said groove, said element having an abrading face angularly disposed to engage and sharpen the cutting faces of the blades of the rotary cutter, a member adapted to detachably and slidably engage the ledger blade, a hand grip on said member for reciprocating it along the ledger blade, and swivelling means attaching said block to said member to allow the groove in said block to adapt itself to the pitch of the blade engaged by it during reciprocation of said member.

14. A manually operable tool for sharpening the blades of a lawn mower or like machine having a helically bladed rotary cutter rotatably cooperating with a ledger blade, comprising a reciprocatory member having a longitudinal groove therein, a flat file secured to one face of said groove, a file member secured between said flat file and the other two faces of said groove, said file member having a bevelled file face, a handle attached to said reciprocatory member for manually reciprocating it with said file and file member in contact with the cutting faces of the ledger blade, an apertured lug on said reciprocatory member, a pin rotatably fitted through the aperture in said lug, a block carried at one end of said pin, said block having a longitudinal groove therein a file member set in said groove and having a bevelled file face to engage the cutting face of any of the blades of the rotary cutter, an enlarged head on said pin, and a spring in compression between said head and lug and surrounding said pin.

15. A tool as defined in claim 14 having a limit screw adjustably screw-threaded into the reciprocatory member and adapted to engage beneath the enlarged head of the pin which carries the grooved block supporting the file member for the blades of the rotary cutter.

HENRY JACKSON EPWORTH.